Sept. 15, 1964     F. A. LARSON     3,148,900
PIPE TO PLATE COUPLING
Filed Dec. 1, 1961     2 Sheets-Sheet 1
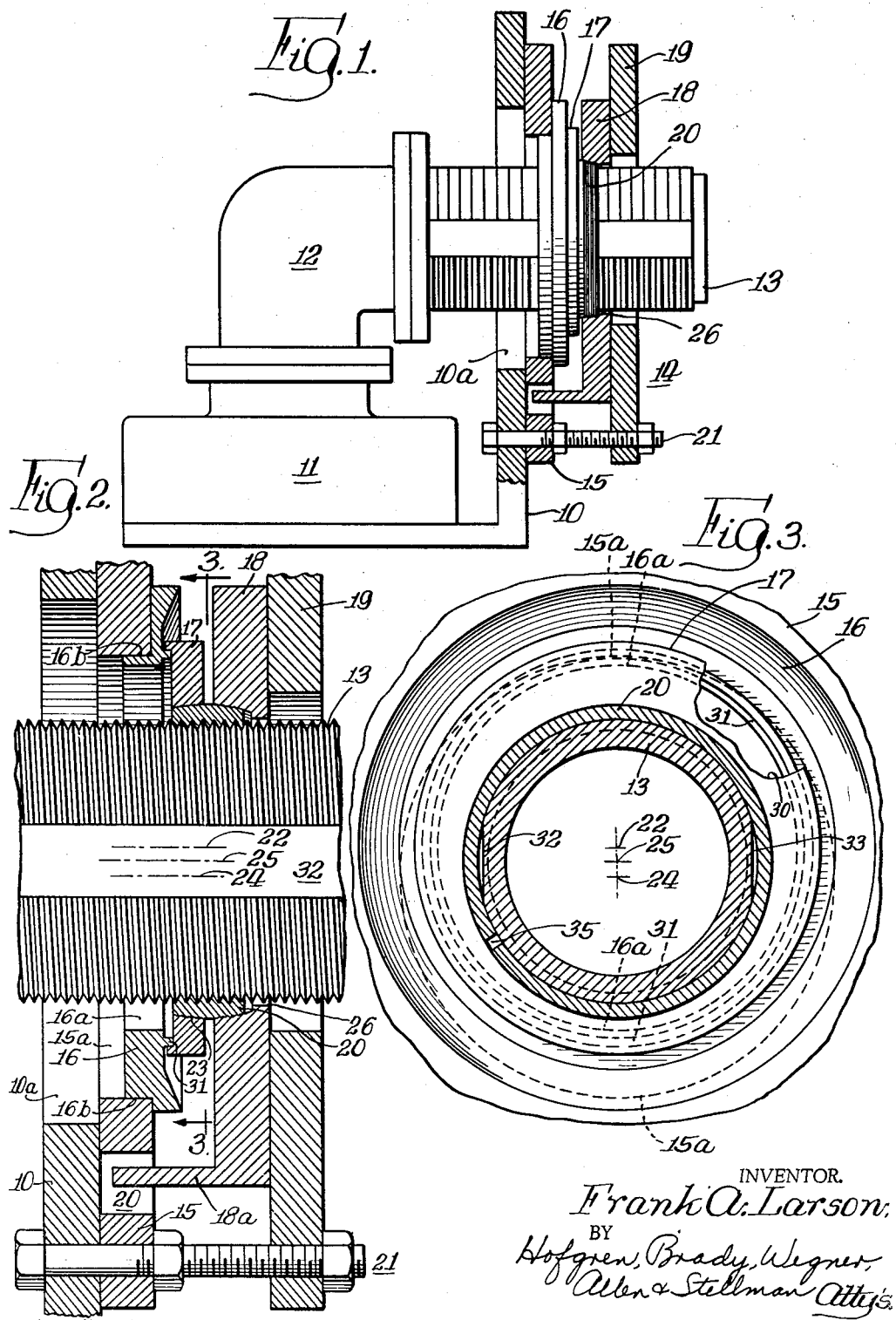
INVENTOR.
Frank A. Larson,
BY Hofgren, Brady, Wegner,
Allen & Stellman Atty's.

Sept. 15, 1964     F. A. LARSON     3,148,900
PIPE TO PLATE COUPLING
Filed Dec. 1, 1961     2 Sheets-Sheet 2

United States Patent Office 3,148,900
Patented Sept. 15, 1964

3,148,900
PIPE TO PLATE COUPLING
Frank A. Larson, Lombard, Ill., assignor to The Hallicrafters Co., a corporation of Delaware
Filed Dec. 1, 1961, Ser. No. 156,344
8 Claims. (Cl. 285—159)

This invention relates to a mechanical adaptor and more specifically to an adaptor for rigidly holding a member, such as an energy transfer device, to a frame which does not apply bending, twisting, or torsional stresses to the member.

In certain types of equipment it is necessary to provide apparatus for mounting a member through a frame, rigidly holding it thereto, but with the limitation that no mechanical stresses are applied to the member where it passes through the frame. An illustration of this is found in high frequency electronic equipment using high frequency devices as magnetrons or the like to which direct connections are made through rigid signal transmitting means, as a section of waveguide. The high frequency device is generally rigidly mounted on a frame; and if the waveguide passes through an aperture in a panel on the frame, it should be mechanically, rigidly coupled thereto. Mechanical tolerances result in misalignments and eccentricities in the parts which give rise to mechanical stresses in the assembly. These mechanical stresses may break the glass of the high frequency device; and may also cause harmful distortions of the signal, produce undesired mechanical vibrations in the device or otherwise disturb the operation of the equipment.

It is therefore an object of this invention to provide an improved mechanical adaptor for securing a tubular element, as a section of waveguide, to a panel through which it passes.

It is a further object of this invention to provide a mechanical adaptor that does not cause distortion between the members coupled thereby.

It is a further object of this invention to provide a mechanical adaptor wherein the members coupled together are easily replaceable.

It is a further object of this invention to provide a mechanical adaptor which allows for positional variations between the members coupled.

One feature of the invention is the provision of a mechanical adaptor for coupling a member with a frame or panel having an aperture through which the member extends, including means, having an eccentric aperture therein for compensating for a positional misalignment of the member and the frame, and further means for compensating for an angular misalignment.

Another feature of this invention is the provision of a mechanical adaptor for rigidly coupling a first member to a frame through a first aperture in the frame which comprises means, including a first planar member rotatable about an axis normal thereto having a second aperture whose center is spaced from the axis. There are further provided means, including a second planar member rotatable about an axis having a third aperture whose center is spaced from the second-mentioned axis. In addition, means are provided for securing the first member to the second planar member and means are further provided for mounting the first and second planar members to the frame with said first, second, and third apertures in alignment.

It is a further feature of this invention to provide in a mechanical adaptor a member of relatively soft material, a coupling means of relatively hard material, a clamping plate of relative soft material and means for securing the adaptor between the two relatively soft materials.

It is still a further feature of this invention to provide a ball swivel nut having serrated edges rigidly clampable between a pair of clamping plates for securely holding a member to a frame.

Further features and advantages will readily be apparent from the following specifications and from the drawings in the several figures of which like reference numerals identify like elements, and in which:

FIGURE 1 is a plan view partly in cross section of one embodiment of the invention;

FIGURE 2 is a vertical cross-sectional view taken along a plane including the axis of the adaptor.

FIGURE 3 is a view along lines 3—3 of FIGURE 2;

Figure 4:
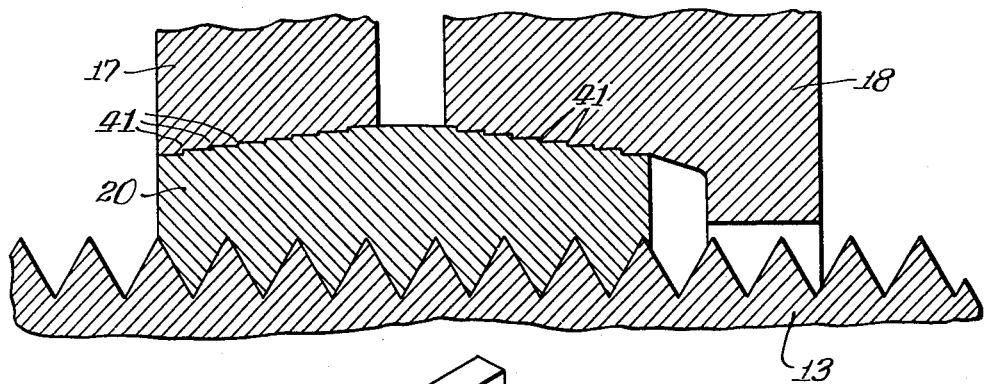
FIGURE 4 is an enlarged sectional view of a portion of the adaptor of FIGURE 2.

Referring now to FIGURE 1, there is shown a frame member 10 supporting a source of high frequency energy 11 (as a magnetron) and an energy transfer device 12 coupled between source 11 and a connector 13 (as a section of waveguide). The mechanical adaptor assembly 14 is shown rigidly affixing connector 13 to frame member 10.

The adaptor assembly consists of a mounting plate 15, a first eccentric means 16, a second eccentric means 17, a clamping plate 18, a second mounting plate 19, and ball swivel nut 20. A nut and bolt assembly 21 rigidly clamps the mechanical adaptor to the frame 10. It is to be understood that, as more clearly shown in FIGURE 5, there are three such nut and bolt assemblies for properly holding the mounting plates to the frame.

The steps of assembly of the mechanical adaptor when the initial assembly is made or subsequently when replacement elements are inserted in the energy source 11 are as follows. Energy transfer device 12 and connector 13 are securely fastened together and connected to the energy source 11. First eccentric 16 and second eccentric 17 are rotated until the connector 13 is approximately centered in an aperture 23 in eccentric 17. Ball swivel nut 20, which is threaded upon connector 13, is then brought snugly against eccentric 17. Clamping plate 18 is then placed next to ball swivel nut 20 and mounting plate 19 is bolted to frame 10 by assemblies 21.

Should the axis of connector 13 be at an angle other than normal to the plane of the frame 10, eccentric 17 and ball swivel nut 20 will meet in a manner hereinafter discussed, as will clamping plate 18 and ball swivel nut 20; such that no stresses are applied through connectors 12 and 13 to source 11.

Referring now to FIGURE 2, which is a detailed cross sectional view of the illustrative embodiment of the adaptor, frame 10 with first aperture 10a of larger diameter than the connector 13 supports mounting plate 15 having a circular aperture 15a, again of larger diameter than the connector 13. Eccentric 16 shaped as a first planar member is rotatably mounted on bearing surfaces 16b in aperture 15a of mounting plate 15 and has a circular second aperture 16a centered about an axis 22. Eccentric 17 shaped as a second planar member has a third aperture 23 having an axis 24 displaced from an axis 25 of connector 13.

Clamping ring 18 has a projection 19 which extends into an aperture 20 in mounting plate 15 which serves as a guide and a stop for the clamping plate. In addition, mounting plate 19 has a fourth aperture 26 of sufficient size to accommodate the connector in its various positions when plate 19 is fastened to frame 10 through nut and bolt assembly 21.

FIGURE 3, which is a sectional view along line 3—3 of FIGURE 2, more clearly shows the eccentricities of the eccentrics. The broken-away section 30 of the FIGURE 3 shows a rib 31 formed about aperture 16a which serves as a bearing surface and guide for rotating eccentric 17. Two planar sections on connector 13 are shown as 32, 33 whose function will be shown hereinafter.

FIGURE 4 is an enlarged cross sectional view through a portion of connector 13, eccentric 17, clamping plate 18 and the ball swivel nut 20. A series of serrations 41 are formed on the outer periphery of the ball swivel nut 20. Eccentric 17 and clamping plate 18 are formed of a relatively soft material such as aluminum, while the ball swivel nut 20 is formed of a material such as steel, which is relatively hard. When the proper alignment of connector 13 has been arrived at, tightening of the mounting plate 19 (not shown in FIGURE 4) causes the clamping plate 18 to move against the serrated edges of ball swivel nut 20 and the metal of eccentric 17. These two plates deform to conform to the outline of the ball swivel nut 20 and a tight mechanical fit is provided for between the three parts. The portions of the two soft metals which apply pressure to the ball swivel nut are the vertical faces of the serrations and the clamping forces are exerted substantially parallel to the axis of connector 13. Thus preventing any stresses being applied through the connector to the source of energy 11.

The serrations 41 on the ball swivel nut have annular edges 41a which define a surface of a sphere, to mate with the spherical surfaces of eccentric 17 and clamping ring 18. The minimum step height in one embodiment of the invention is of the order of 0.003 inch, for adequate penetration of the mating parts.

Figure 5:
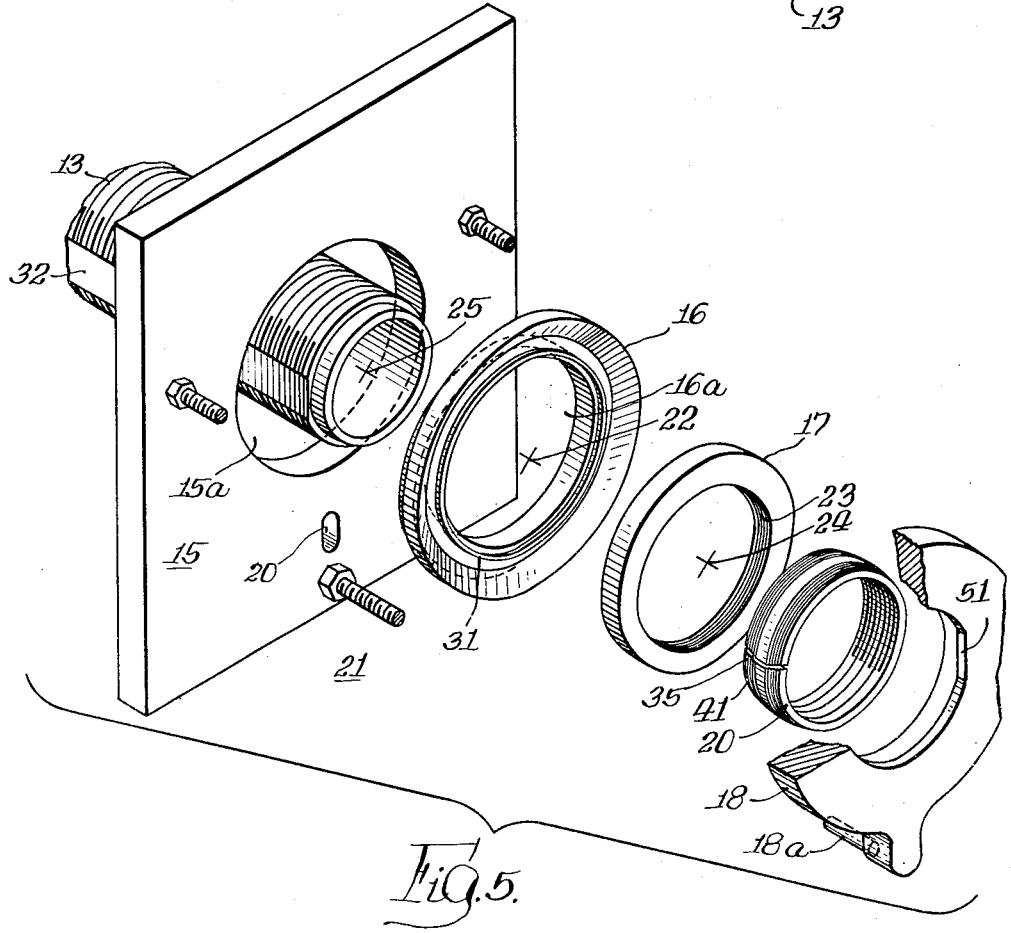
FIGURE 5 is an exploded view of part of the assembly of the adaptor shown in FIGURE 1.

The exploded view of the adaptor assembly shown in FIGURE 5 shows the relationship of parts of the adaptor.

It is to be noted that the clamping plate 18 is shown as having a substantially flat portion 51 and it is to be understood that a similarly flat portion exists substantially 180° from the shown portion 51. These two flat areas mate with the areas 32 and 33 of the connector 13 and serve as a guide which prevents rotation of the connector 13.

When assembling the connector 13 through aperture 10 of frame 10, eccentric 16 is rotated in aperture 15a causing the center of the second aperture 16a to rotate about axis 25. Eccentric 17 is also rotated during the aligning procedure and axis 24 of third aperture 23 also rotates about axis 22. When the connector 13 is centered in third aperture 23, the ball swivel nut 20 is threaded upon connector 13 until it engages third aperture 23 of eccentric 17. If there is any deviation of the axis 25 from a right angle with plate 15, nut 20 engages eccentric planar member 17 in a "cocked" position. Clamping plate 18 is then brought up against the nut 20, plate 19 is then fastened to the nut and bolt assembly 21. Since the nut 20 is clamped between two substantially parallel plates and since the serrated edges 41 deform the metal of the plates 17 and 18, no distortional forces are applied to connector 13.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A mechanical adaptor for rigidly coupling a first member to a frame through a first aperture in said frame comprising: means, including a first planar member rotatable about an axis normal thereto having a second aperture whose center is spaced from said axis; means, including a second planar member of relatively soft material rotatable about an axis having a third aperture whose center is spaced from said second mentioned axis; means, including an adaptor of relatively hard material and a clamping plate of relatively soft material having a fourth aperture for securing said first member to said second planar member; and means for mounting said first and second planar member and said clamping plate to said frame with said first, second, third and fourth apertures in alignment.

2. A mechanical adaptor, for rigidly coupling a first member to a frame through a first aperture in said frame, comprising: first and second clamping plates having second and third apertures respectively, said first, second and third apertures being larger than said first member; means for securing said clamping plates to said frame so that said apertures are in alignment; and means, including a hollow cylindrical member adapted to be rigidly secured along its inner surface to said first member and having an outer surface contacting the edges of said second and third apertures when said clamping plates are secured to said frame, for maintaining said first member rigidly fixed with respect to said frame.

3. A mechanical adaptor, for rigidly coupling a first member to a frame through a first aperture in said frame, comprising: first and second clamping plates having second and third apertures respectively, said first, second and third apertures being larger in diameter than said first member; means for securing said clamping plates to said frame so that said apertures are in alignment; and means, including a hollow member having an outer surface defined by that portion of a spherical surface bounded by a pair of parallel planes intersecting a sphere parallel to and including therebetween a major diameter of said sphere adapted to be rigidly secured along its inner surface to said first member said outer surface contacting the edges of said second and third apertures when said clamping plates are secured to said frame for maintaining said first member rigidly fixed with respect to said frame.

4. The adaptor as claimed in claim 3 wherein said outer surface has a series of ridges formed thereon.

5. The adaptor as claimed in claim 4 wherein the clamping plates are formed of relatively soft material and the hollow member is formed of relatively hard material.

6. A mechanical adaptor for rigidly coupling a first member having a threaded outer portion to a frame through a first aperture in said frame, comprising: means, including a first planar member rotatable about an axis normal thereto having a second aperture whose center is spaced from said axis; means, including a second planar member rotatable about an axis having a third aperture whose center is spaced from said second mentioned axis; a clamping plate having a fourth aperture therein; a hollow cylindrical member having an inner surface adapted to be threaded on said first member and having an outer surface; means for securing said outer surface of said cylindrical member in said third and fourth apertures; and means for mounting said first and second planar members and said clamping plate to said frame with said first, second, third and fourth apertures in alignment.

7. A mechanical adaptor for rigidly coupling a first member having a threaded outer portion to a frame through a first aperture in said frame, comprising: means, including a first planar member rotatable about an axis normal thereto having a second aperture whose center is spaced from said axis; means, including a second planar member rotatable about an axis, having a third aperture whose center is spaced from said second mentioned axis; means including a hollow cylindrical member having a portion of its inner surface threaded to engage said threaded outer portion mounted on said first member means, including a clamping plate engaging said cylindrical member, for maintaining said cylindrical member in contact with the edges of said third aperture; and means for mounting said first and second planar members and said clamping plate to said frame with said first, second and third apertures in alignment.

8. A mounting for an apparatus, comprising: a frame having an aperture; a device having a body with a mounting portion secured to said frame; a member rigidly mechanically connected with said device and extending through said aperture; and adaptor means, including a first plate having an off center second aperture, a second plate having an off center third aperture, a ball swivel nut threaded on said member, a clamping plate having a fourth aperture and a nut between said clamping frame member rigidly holding said clamping plate and second plate, for adjustably holding said member rigid with respect to said frame.

References Cited in the file of this patent

UNITED STATES PATENTS

| | | |
|---|---|---|
| 2,039,709 | Crumrine | May 5, 1936 |
| 2,295,416 | Madison | Sept. 8, 1942 |
| 2,359,702 | Wittig | Oct. 3, 1944 |
| 2,836,437 | Wayman | May 27, 1958 |